(12) United States Patent
Paterson et al.

(10) Patent No.: US 7,794,518 B2
(45) Date of Patent: Sep. 14, 2010

(54) FILTER SYSTEM FOR AN AIR CLEANER

(75) Inventors: Christopher M. Paterson, Biloxi, MS (US); Charles W. Reynolds, Long Beach, MS (US); Dennis T. Lamb, Long Beach, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 1177 days.

(21) Appl. No.: 11/364,171

(22) Filed: Feb. 28, 2006

(65) Prior Publication Data

US 2007/0199288 A1 Aug. 30, 2007

(51) Int. Cl.
*B01D 46/46* (2006.01)
(52) U.S. Cl. .............. 55/473; 55/385.1; 55/385.2; 55/481; 55/486; 55/487; 55/472; 55/467; 55/506; 55/493; 55/471; 55/DIG. 31; 62/78; 62/314; 62/331; 62/440; 62/441; 454/187
(58) Field of Classification Search ........... 55/385.1, 55/385.2, 481, 486, 487, 472, 473, 467, 506, 55/493, 471, DIG. 31, 491; 454/187, 290, 454/325; 62/78, 314, 331, 440, 441
See application file for complete search history.

(56) References Cited

U.S. PATENT DOCUMENTS

| 4,253,852 A | 3/1981 | Adams |
| 4,326,861 A | 4/1982 | Matsumoto |
| 4,473,382 A | 9/1984 | Cheslock |
| 4,516,991 A | 5/1985 | Kawashima |
| 4,682,993 A | 7/1987 | Todd et al. ............... 55/314 |
| 4,900,344 A * | 2/1990 | Lansing ................. 55/322 |
| 5,035,728 A | 7/1991 | Fang |
| 5,984,776 A * | 11/1999 | Berger ................. 454/290 |
| 6,036,736 A * | 3/2000 | Wallace et al. ........... 55/385.2 |
| 6,217,627 B1 | 4/2001 | Vyskocil |
| 7,112,232 B2 * | 9/2006 | Chang et al. ............ 55/481 |
| 7,465,327 B2 * | 12/2008 | Jang et al. ............. 55/385.1 |

FOREIGN PATENT DOCUMENTS

EP 1 433 514 6/2004

OTHER PUBLICATIONS

International Search Report, Application No. PCT/US2007/062865, dated Jun. 18, 2007.
Examination Report for GB0815583.0, dated May 26, 2010.

* cited by examiner

*Primary Examiner*—Robert A Hopkins
*Assistant Examiner*—Minh-Chau T Pham
(74) *Attorney, Agent, or Firm*—Winston & Strawn LLP

(57) ABSTRACT

A filter system for an air cleaner is provided according to an embodiment of the invention. The filter system includes one or more filter elements and a filter tray adapted to be received in a filter tray receptacle of the air cleaner. The filter tray includes a bottom surface and one or more bottom airflow apertures formed in the bottom surface. The filter tray receives the one or more filter elements.

28 Claims, 10 Drawing Sheets

FILTER SYSTEM FOR AN AIR CLEANER

TECHNICAL FIELD

The present invention relates to an air cleaner, and more particularly, to a filter system for an air cleaner.

BACKGROUND OF THE INVENTION

Air cleaners and purifiers are widely used for removing foreign substances from the air. The foreign substances can include pollen, dander, smoke, pollutants, dust, etc. In addition, an air cleaner can be used to circulate room air. An air cleaner can be used in many settings, including at home, in offices, workrooms, etc.

In a prior art air cleaner, a filter is typically inserted directly into some manner of filter slot or filter receptacle in the air cleaner. However, this prior art approach has drawbacks. The stand-alone prior art filter may not be sufficiently rigid, and can flex and buckle under conditions of a strong airflow. In the prior art air cleaner, the filter generally fits somewhat loosely into a slide-in holder, grooves, etc., and therefore air can leak around the edges of the filter. The prior art air cleaner generally does not clamp or securely hold the filter. The prior art air cleaner does not generally accommodate multiple filters. The prior art air cleaner cannot clamp or securely hold one or more filters.

SUMMARY OF THE INVENTION

A filter system for an air cleaner is provided according to an embodiment of the invention. The filter system comprises one or more filter elements and a filter tray adapted to be received in a filter tray receptacle of the air cleaner. The filter tray includes a bottom surface and one or more bottom airflow apertures formed in the bottom surface. The filter tray receives the one or more filter elements.

A filter system for an air cleaner is provided according to an embodiment of the invention. The filter system comprises one or more filter elements and a filter tray adapted to be received in a filter tray receptacle of the air cleaner. The filter tray includes a bottom surface and one or more bottom airflow apertures formed in the bottom surface. The filter tray receives the one or more filter elements. The filter system further comprises a tray cover portion that fits to the filter tray and traps the one or more filter elements. The tray cover portion includes one or more top airflow apertures.

An air cleaner is provided according to an embodiment of the invention. The air cleaner comprises a chassis including a filter tray receptacle, one or more filter elements, and a filter tray adapted to be received in the filter tray receptacle. The filter tray includes a bottom surface and one or more bottom airflow apertures formed in the bottom surface. The filter tray receives the one or more filter elements. The filter tray and the one or more filter elements are configured to slide into and out of the filter tray receptacle.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 1-10 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
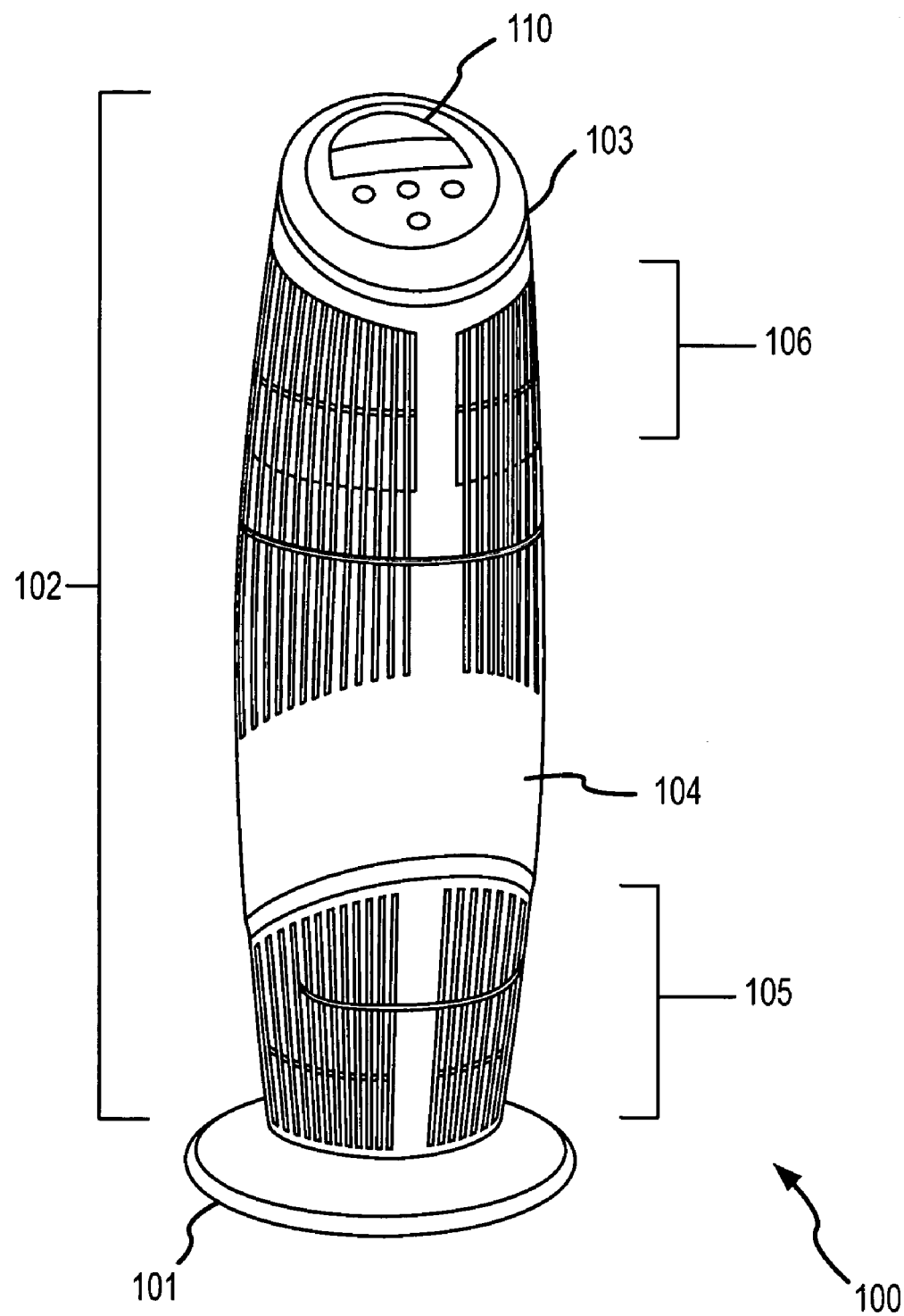
FIG. 1 shows a tower air cleaner according to an embodiment of the invention.

FIG. 1 shows a tower air cleaner 100 according to an embodiment of the invention. The tower air cleaner 100 includes a base portion 101 and a tower portion 102. The tower portion 102 can be generally vertically positioned and elongate in shape. In one embodiment, the tower portion 102 can be substantially cylindrical in shape. The tower portion 102 includes a shell 103, one or more doors 104, and a control panel 110. The tower portion 102 further includes an air inlet 105 and an air outlet 106. Air is drawn in through the air inlet 105, is cleaned inside the tower portion 102, and the cleaned air is exhausted from the air outlet 106. However, it should be understood that the air cleaner 100 can comprise other shapes, configurations, and designs, and the tower configuration is shown merely for illustration.

The air inlet 105 is shown as being at the lower end of the tower portion 102. However, it should be understood that alternatively the relative positions of the air inlet 105 and the air outlet 106 could be interchanged.

Figure 2:
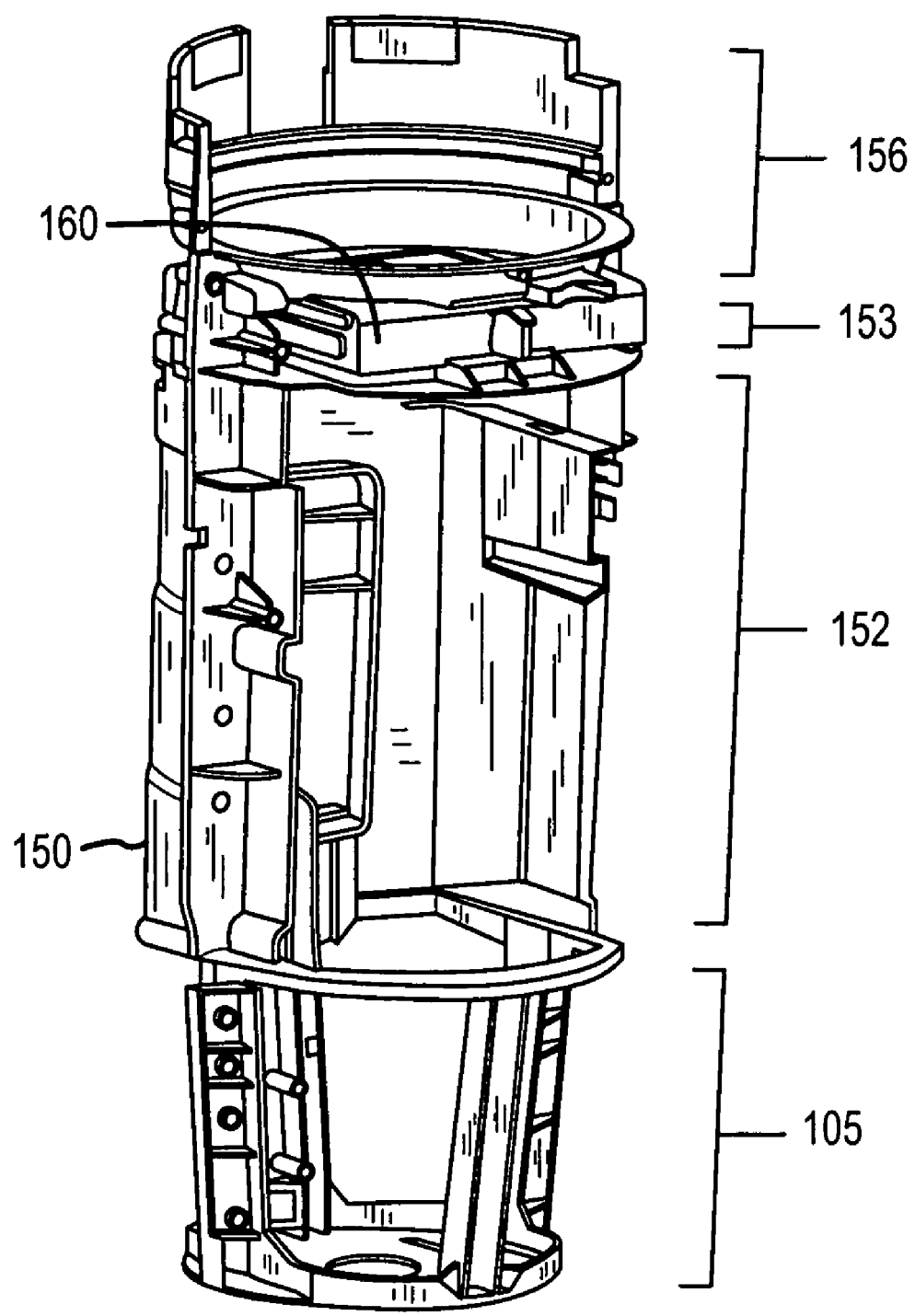
FIG. 2 shows at least a portion of a chassis of the air cleaner according to an embodiment of the invention.

FIG. 2 shows at least a portion of a chassis 150 of the air cleaner 100 according to an embodiment of the invention. The chassis 150 includes an air cleaning element receptacle 152, a filter tray receptacle 153, and an air moving device chamber 156. A filter system 160 can be inserted into and removed from the filter tray receptacle 153. When the door 104 of the air cleaner 100 is closed, the door 140 conceals the filter system 160. An air moving device (not shown) is located in the air moving device chamber 156 and creates an upward airflow through the air cleaning element receptacle 152 and through the filter tray receptacle 153.

The filter system 160 can comprise any manner of air cleaning element. In one embodiment, the filter system 160 comprises a post-filter. The filter system 160 can remove particles from the airflow, such as dirt and debris. The filter system 160 in some embodiments can substantially remove odors from the airflow. The filter system 160 in some embodiments can substantially remove Volatile Organic Chemicals (VOCs) from the airflow. The filter system 160 in some embodiments can substantially remove ozone from the airflow. In some embodiments, the filter system 160 can add a fragrance or odor to the airflow.

The air cleaning element receptacle 152 can receive any manner of air cleaning element (not shown). In one embodiment, the air cleaning element comprises an electrostatic precipitator that employs high voltages to draw dirt and debris out of the airflow. Because the electrostatic precipitator is comprised of high voltage electrode wires and/or electrode plates that are open to the filter tray receptacle 153, it is highly desirable that the filter tray receptacle 153 not be easily accessible to persons.

Figure 3:
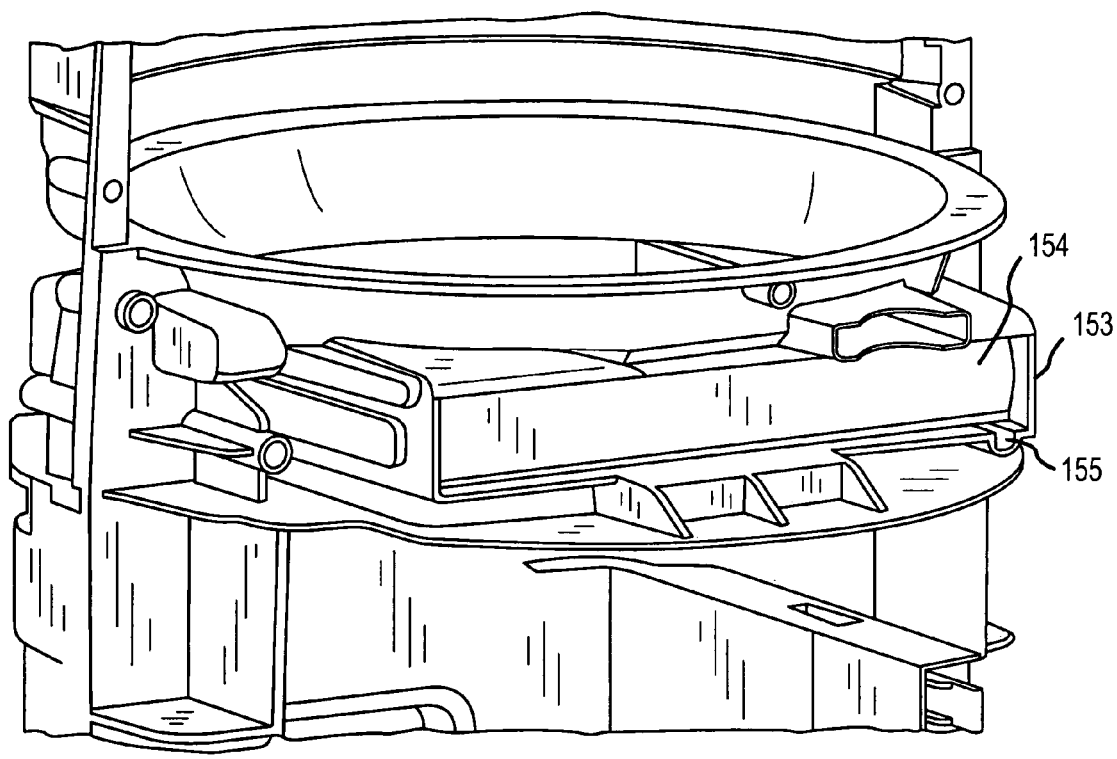
FIG. 3 is a close-up view of a filter tray receptacle according to an embodiment of the invention.

FIG. 3 is a close-up view of the filter tray receptacle 153 according to an embodiment of the invention. The filter tray receptacle 153 can include a door 154. The door 154 is hinged to the chassis 150. As a result, the door 154 swings backward and upward when the filter system 160 is inserted into the filter tray receptacle 153. The door 154 can block the filter tray receptacle 153 when the filter system 160 is not in place. Therefore, as discussed above, an electrostatic precipitator located in the air cleaning element receptacle 152 cannot be easily reached or accessed by fingers or other portions of human anatomy.

The figure further shows an orientation guide slot 155 formed in the filter tray receptacle 153. The orientation guide slot 155 receives a corresponding orientation guide projection(s) 167 of the filter system 160 (see FIG. 8). The orientation guide slot 155 therefore ensures that the filter system 160 is not inserted upside-down or otherwise improperly aligned.

Figure 4:
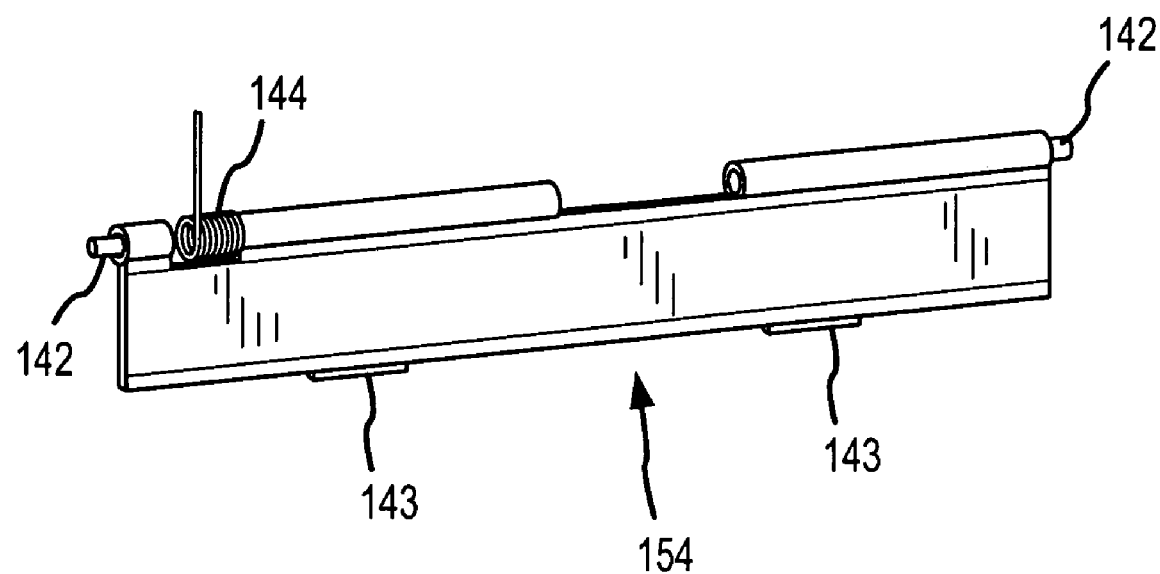
FIG. 4 shows detail of a door according to the invention.

FIG. 4 shows detail of the door 154 according to the invention. The door 154 can include a hinge pin 142, one or more stop projections 143, and a spring 144. The hinge pin (or pins) 142 can be received in some manner of aperture or socket, and allows the door 154 to pivot around an axis. The one or more stop projections 143 can contact one or more corresponding portions of the chassis 150. The spring 144 exerts a closing force on the door 154 when the door is moved away from the fully closed position.

Figure 5:
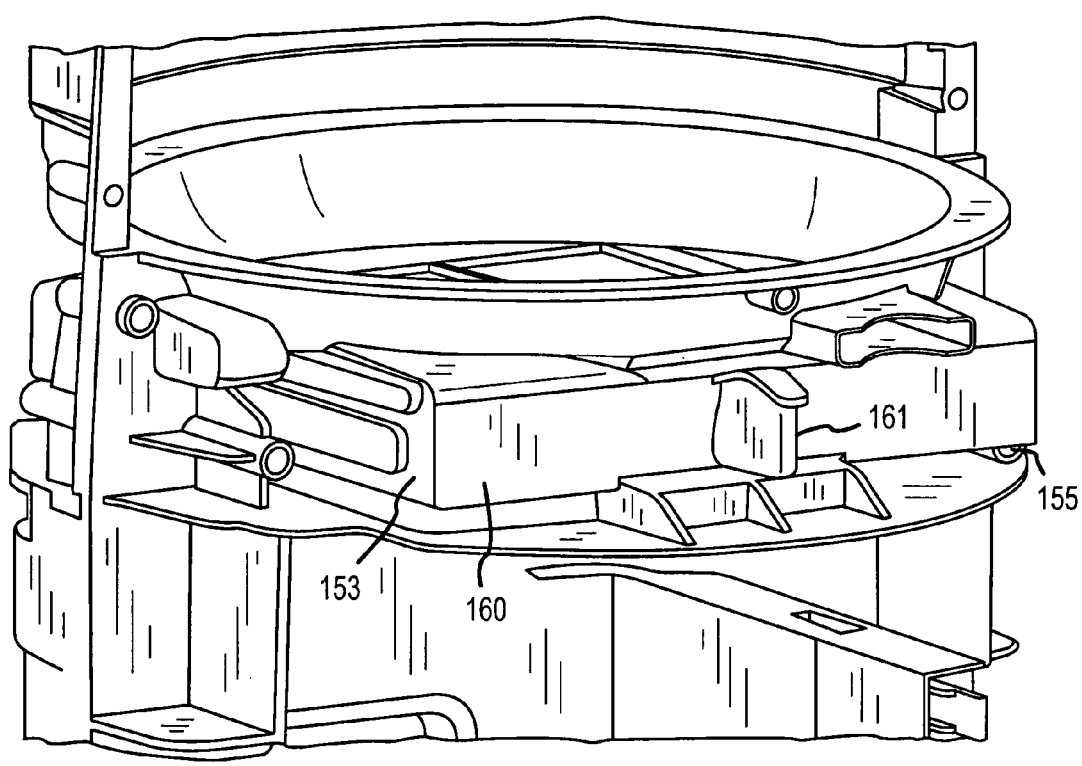
FIG. 5 is a close-up view of the filter tray receptacle according to an embodiment of the invention.

FIG. 5 is a close-up view of the filter tray receptacle 153 according to an embodiment of the invention. In this figure, the filter system 160 has been fully inserted into the filter tray receptacle 153. Therefore, the door 154 has been forced to a fully open position and is not visible. In addition, the filter system 160 can contact a switch when the filter system 160 is substantially fully inserted into the filter tray receptacle 153. The switch can detect the presence or absence of the filter system 160.

This figure also shows a grip portion 161 of the filter system 160. The grip portion 161 can be grasped in order to handle the filter system 160. The grip portion 161 can be grasped in order to pull the filter system 160 out of the filter tray receptacle 153 or in order to insert the filter system 160 into the filter tray receptacle 153.

Figure 6:
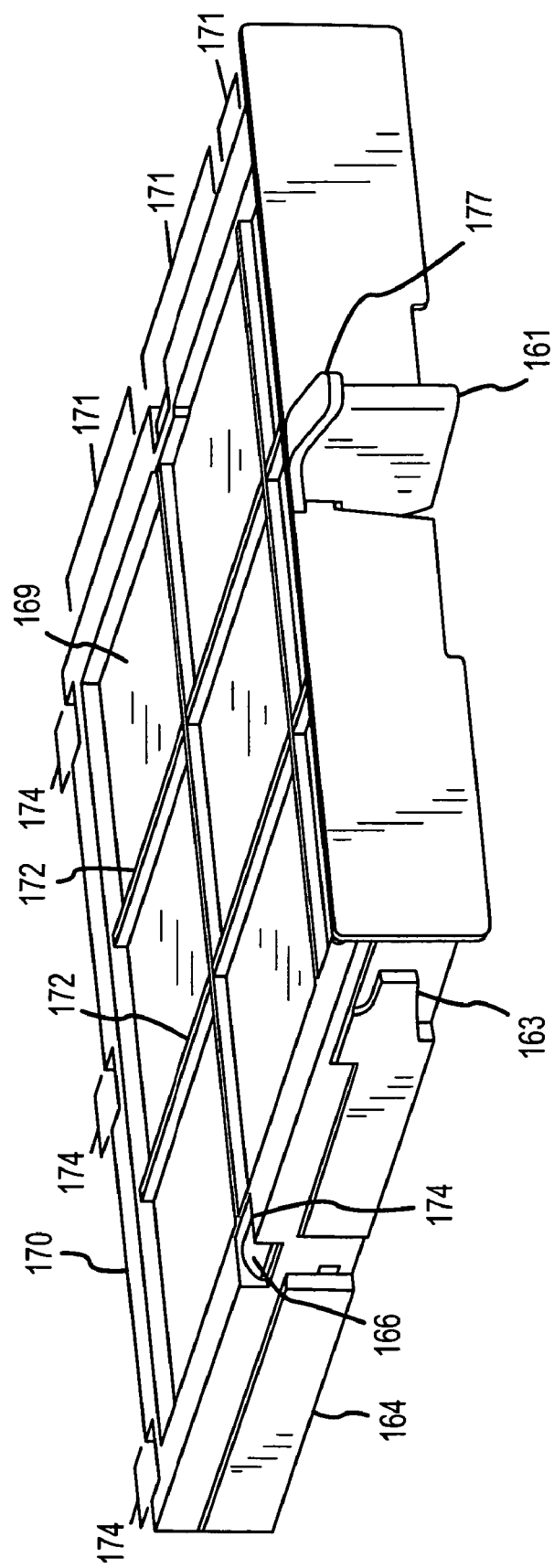
FIG. 6 shows a filter system according to an embodiment of the invention.

FIG. 6 shows the filter system 160 according to an embodiment of the invention. The filter system 160 includes a filter tray 164, a tray cover portion 170, and one or more filter elements 169 retained between the filter tray 164 and the tray cover portion 170.

The filter tray 164 and the tray cover portion 170 together provide a tray assembly that holds and protects the one or more filter elements 169. Consequently, the one or more filter elements 169 do not need to be rigid and do not need an integral frame structure. Therefore, when the filter system 160 is placed into the filter tray receptacle 153, the filter system 160 retains its integrity when the airflow is passing through it.

Figure 7:
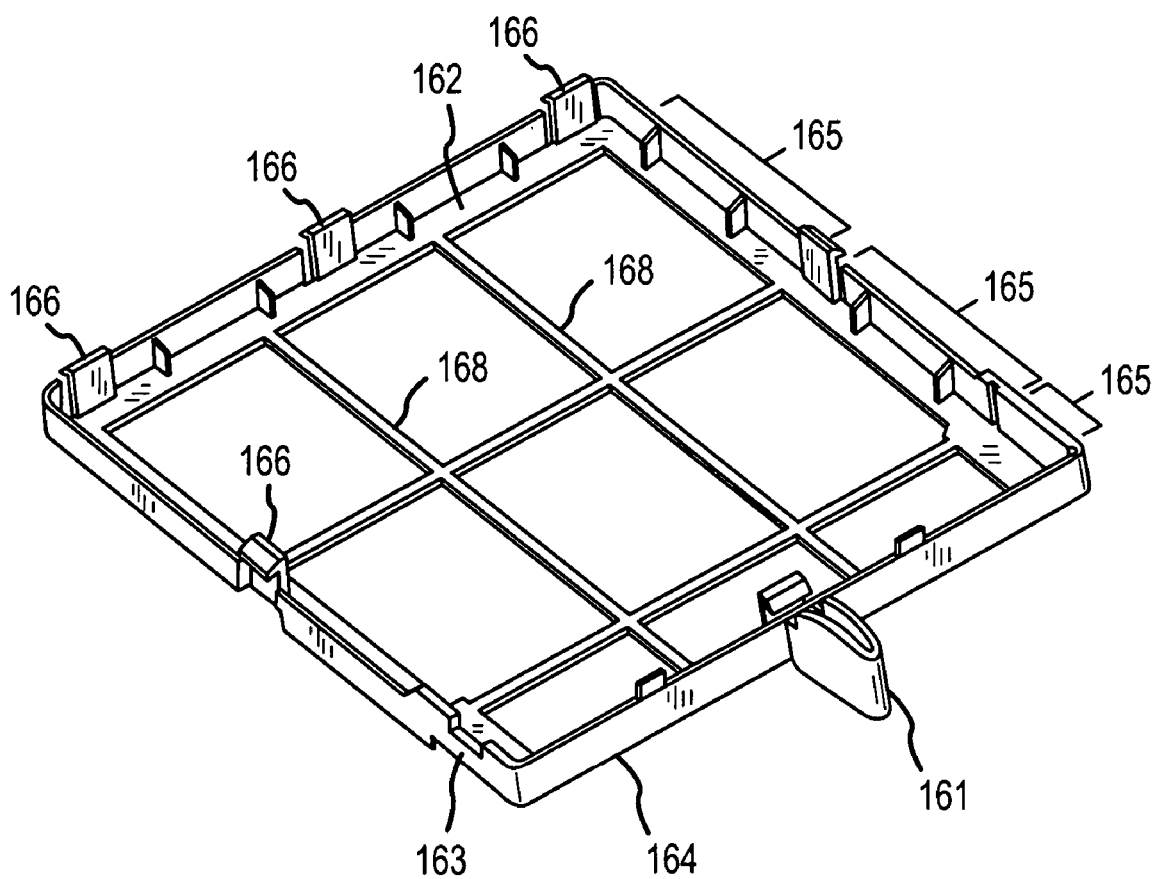
FIG. 7 shows a filter tray according to an embodiment of the invention.

The filter tray 164 includes one or more bottom airflow apertures 165 formed in a bottom surface 162 (see FIG. 7). Consequently, the airflow through the air cleaner 100 passes through the filter tray 164 and through the one or more filter elements 169. The filter tray 164 includes one or more latch projections 163 that extend from the at least one side of the filter tray 164. The one or more latch projections 163 interact with and latch to the chassis 150 in order to retain the filter tray 164 (see FIG. 9 and the accompanying discussion).

The filter tray 164 further includes a plurality of fastener projections 166 that extend upwards. The plurality of fastener projections 166 engage and retain the tray cover portion 170. In one embodiment, the plurality of fastener projections 166 comprise a plurality of barbed fastener projections 166.

The tray cover portion 170 includes one or more top airflow apertures 171, a plurality of upper retaining members 172, and a plurality of fastener apertures 174. The upper retaining members 172 trap and keep the one or more filter elements 169 in the filter system 160. The plurality of fastener apertures 174 correspond to the plurality of fastener projections 166. The plurality of fastener apertures 174 receive and retain the plurality of fastener projections 166 of the filter tray 164. The tray cover portion 170 further includes an upper grip portion 177 that fits to and is part of the grip portion 161.

FIG. 7 shows the filter tray 164 according to an embodiment of the invention. The filter tray 164 further includes a bottom surface 162, the one or more bottom airflow apertures 165, and a plurality of lower retainer members 168 that trap and keep the one or more filter elements 169. The bottom surface 162 and the lower retainer members 168 support an underside of the one or more filter elements 169. The figure also shows the plurality of fastener projections 166 the one or more bottom airflow apertures 165, and the one or more latch projections 163.

Figure 8:
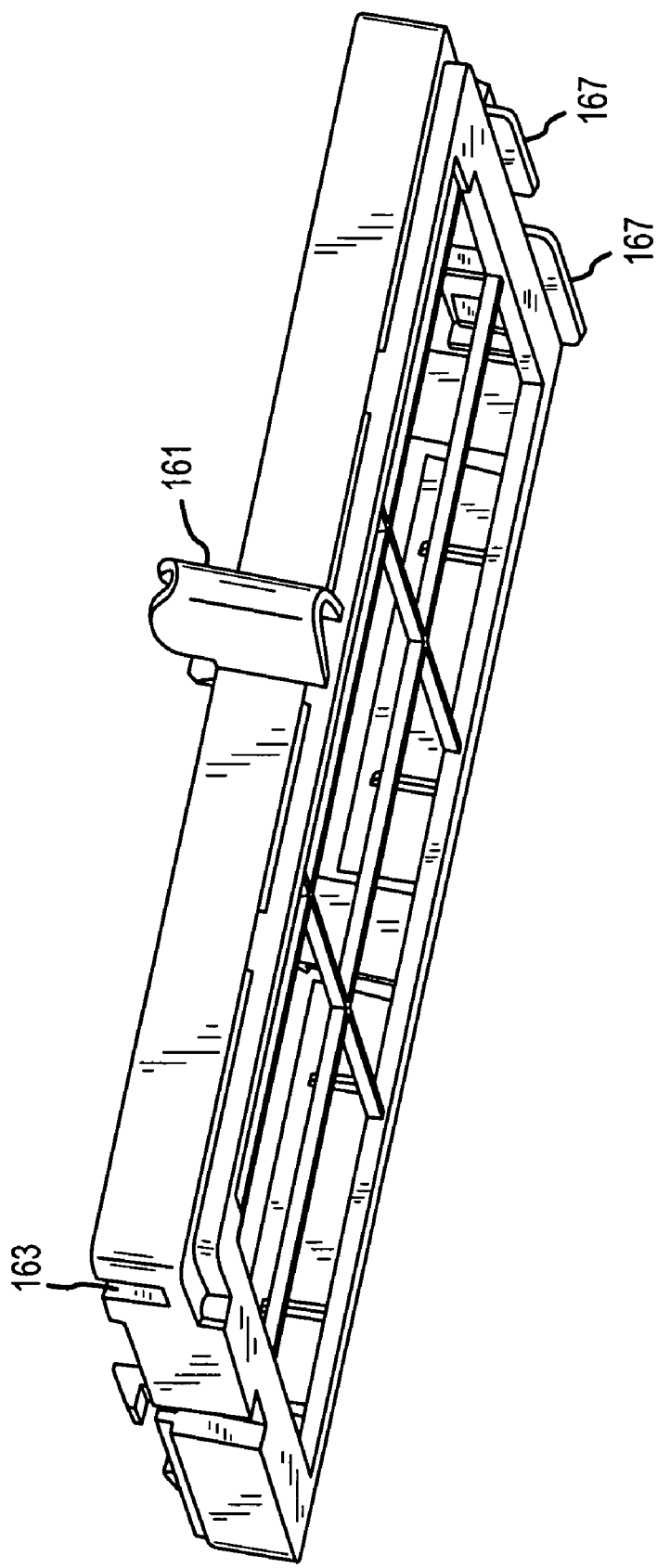
FIG. 8 shows the underside of the filter tray according to an embodiment of the invention.

FIG. 8 shows the underside of the filter tray 164 according to an embodiment of the invention. This figure further shows one or more orientation guide projections 167 formed on the underside. The one or more orientation guide projections 167 fit to the orientation guide slot 155 in the filter tray receptacle 153 (see FIG. 5). The combination of the one or more orientation guide projections 167 and the orientation guide slot 155 ensures that the filter tray 164 can only be inserted into the filter tray receptacle 153 in a proper orientation. The combination will not allow the filter tray 164 to rotate, shift sideways, etc.

Figure 9:
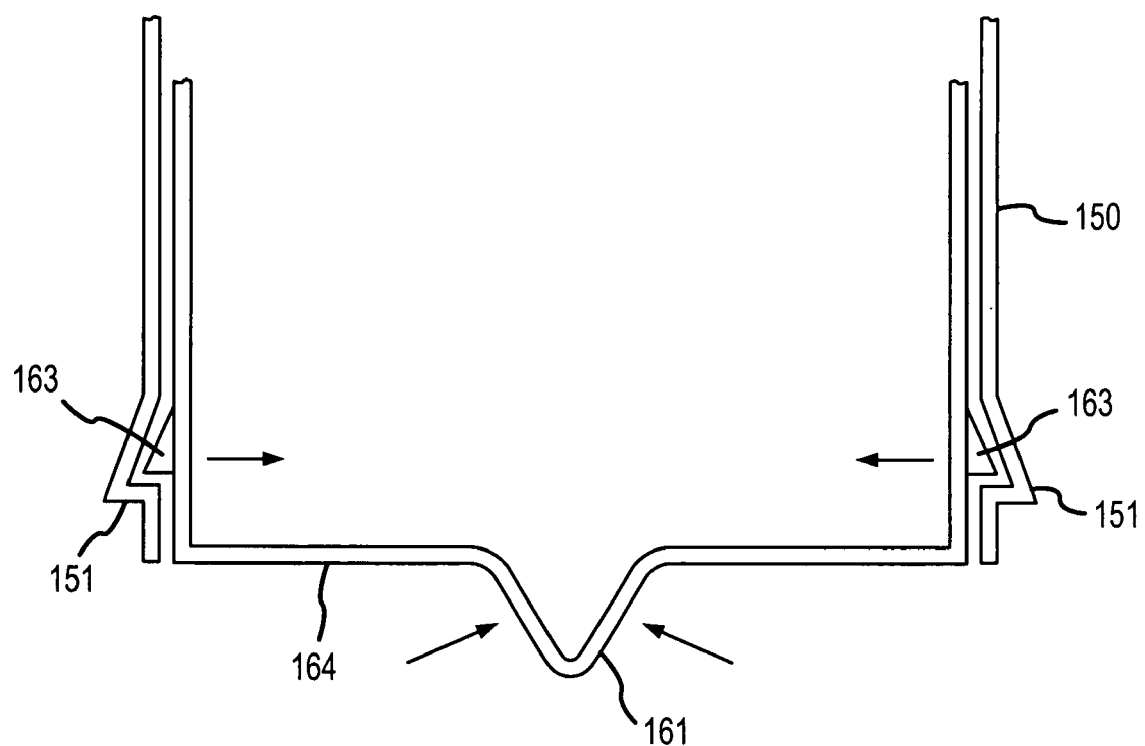
FIG. 9 shows the functioning of one or more latch projections of the filter tray according to an embodiment of the invention.

FIG. 9 shows the functioning of the one or more latch projections 163 of the filter tray 164 according to an embodiment of the invention. The one or more latch projections 163 extend from the sides of the filter tray 164. Normally, the one or more latch projections 163 engage one or more corresponding recesses 151 in the chassis 150 when the filter tray 164 is fully inserted. However, when a grip force is placed on the grip portion 161, the grip portion 161 can be compressed (see arrows). Compression of the grip portion 161 pulls in the sides of the filter tray 164 and pulls the one or more latch projections 163 inward (see arrows). As a result, the one or more latch projections 163 disengage from the recesses 151 and the filter tray 164 can subsequently be pulled out.

Figure 10:
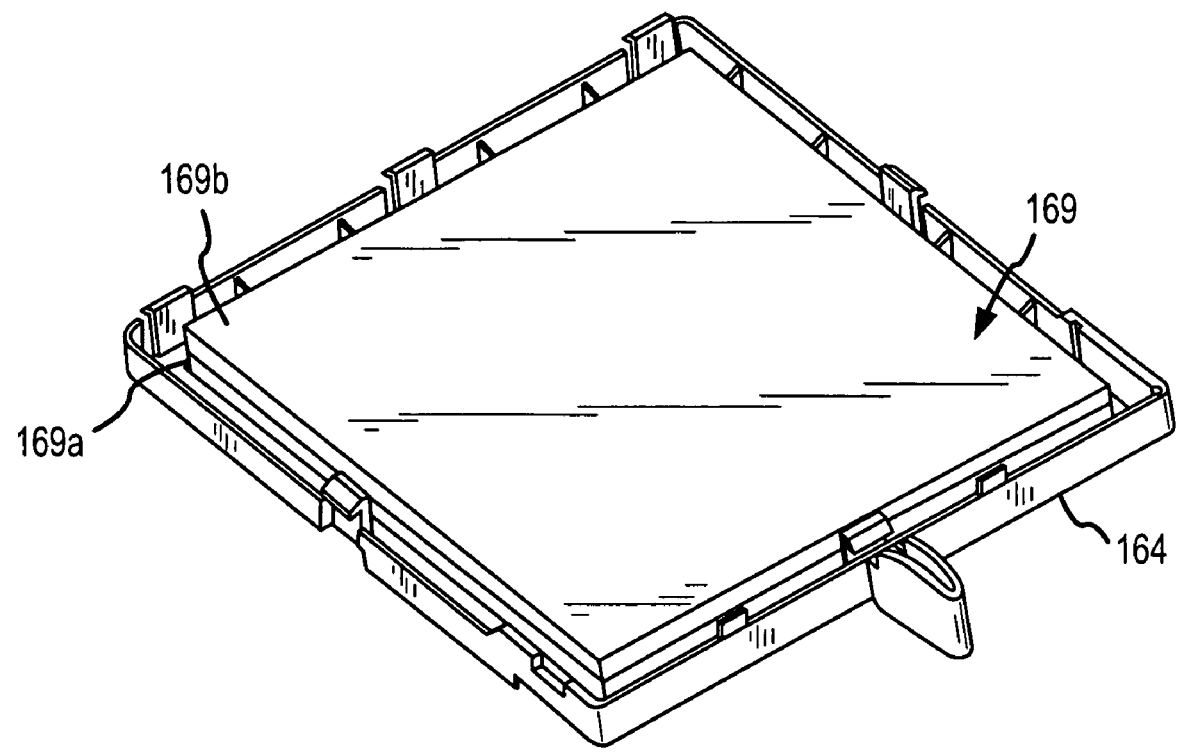
FIG. 10 shows the filter tray holding one or more filter elements according to an embodiment of the invention.

FIG. 10 shows the filter tray 164 holding the one or more filter elements 169 according to an embodiment of the invention. Because the filter tray 164 includes the one or more bottom airflow apertures 165 and the lower retainer members 168 and because the tray cover portion 170 includes the one or more top airflow apertures 171 and the upper retaining members 172, airflow can easily pass through the filter system 160. The upper retaining members 172 and the lower retainer members 168 present minimal obstructions to the airflow, while retaining the one or more filter elements 169.

In some embodiments, the one or more filter elements 169 comprise multiple elements, as shown. Each element can be used for a different air cleaning purpose and therefore can have different properties. In the figure, the one or more filter elements 169 comprise a first element 169a and a second element 169b. In one embodiment, the first element 169a can comprise an ozone removing element while the second element 169b can remove Volatile Organic Chemicals (VOCs) or odors, for example.

The filter system according the invention can be implemented according to any of the embodiments in order to obtain several advantages, if desired. Advantageously, the invention provides a small, lightweight, and simple filter system for an air cleaner device. The invention provides a filter system that includes at least two parts that receive and trap a filter element or filter elements. The invention provides a filter system that allows relatively unimpeded air flow. The invention provides a filter system that is easy to install and remove. The invention provides a filter system that comprises a filter tray and a tray cover portion that trap and retain the one or more filter elements. The invention provides a filter system that can slide into and out of a receptacle in an air cleaner device. The invention provides a filter system that eliminates the need for a rigid filter or a rigid filter frame.

What is claimed is:

1. A filter system for an air cleaner, comprising:
    one or more filter elements;
    a filter tray adapted to be received in a filter tray receptacle of the air cleaner, with the filter tray including a bottom surface and one or more bottom airflow apertures formed in the bottom surface and wherein the filter tray receives the one or more filter elements;
    a grip portion that extends from a front of the filter tray; and
    one or more latch projections that extend from at least one side of the filter tray, with the one or more latch projections being adapted to latch to a chassis of the air cleaner, wherein the one or more latch projections are configured to disengage the chassis when the grip portion is squeezed.

2. The filter system of claim 1, wherein the filter system is adapted to slide into and out of the filter tray receptacle.

3. The filter system of claim 1, further comprising a tray cover portion that fits to the filter tray and traps the one or more filter elements, with the tray cover portion including one or more top airflow apertures.

4. The filter system of claim 1, further comprising a tray cover portion that fits to the filter tray and traps the one or more filter elements, with the tray cover portion including one or more top airflow apertures and with the tray cover portion being affixed to the filter tray by one or more fasteners and one or more corresponding fastener apertures.

5. The filter system of claim 1, further comprising:
    a tray cover portion that fits to the filter tray and traps the one or more filter elements, with the tray cover portion including one or more top airflow apertures;
    one or more fastener projections extending from one of the filter tray or the tray cover portion; and
    one or more corresponding fastener apertures formed on the opposing tray cover portion or the opposing filter tray, wherein the one or more fastener apertures receive and trap the one or more fastener projections.

6. The filter system of claim 1, further comprising:
    a tray cover portion that fits to the filter tray and traps the one or more filter elements, with the tray cover portion including one or more top airflow apertures;
    one or more barbed fastener projections extending from one of the filter tray or the tray cover portion; and
    one or more corresponding fastener apertures formed on the opposing tray cover portion or the opposing filter tray, wherein the one or more fastener apertures receive and trap the one or more barbed fastener projections.

7. The filter system of claim 1, further comprising a grip portion that extends from a front of the filter tray.

8. The filter system of claim 1, further comprising one or more latch projections that extend from at least one side of the filter tray, with the one or more latch projections being adapted to latch to a chassis of the air cleaner.

9. The filter system of claim 1, further comprising one or more orientation guide projections formed on the filter tray and adapted to fit to an orientation guide slot in the filter tray receptacle.

10. A filter system for an air cleaner, comprising:
    one or more filter elements;
    a filter tray adapted to be received in a filter tray receptacle of the air cleaner, with the filter tray including a bottom surface and one or more bottom airflow apertures formed in the bottom surface and wherein the filter tray receives the one or more filter elements; and
    a tray cover portion that fits to the filter tray and traps the one or more filter elements, with the tray cover portion including one or more top airflow apertures.

11. The filter system of claim 10, wherein the filter system is adapted to slide into and out of the filter tray receptacle.

12. The filter system of claim 10, with the tray cover portion being affixed to the filter tray by one or more fasteners and one or more corresponding fastener apertures.

13. The filter system of claim 10, further comprising:
    one or more fastener projections extending from one of the filter tray or the tray cover portion; and
    one or more corresponding fastener apertures formed on the opposing tray cover portion or the opposing filter tray, wherein the one or more fastener apertures receive and trap the one or more fastener projections.

14. The filter system of claim 10, further comprising:
    one or more barbed fastener projections extending from one of the filter tray or the tray cover portion; and
    one or more corresponding fastener apertures formed on the opposing tray cover portion or the opposing filter tray, wherein the one or more fastener apertures receive and trap the one or more barbed fastener projections.

15. The filter system of claim 10, further comprising a grip portion that extends from a front of the filter tray.

16. The filter system of claim 10, further comprising one or more latch projections that extend from at least one side of the filter tray, with the one or more latch projections being adapted to latch to a chassis of the air cleaner.

17. The filter system of claim 10, further comprising:
    a grip portion that extends from a front of the filter tray; and
    one or more latch projections that extend from at least one side of the filter tray, with the one or more latch projections being adapted to latch to a chassis of the air cleaner, wherein the one or more latch projections are configured to disengage the chassis when the grip portion is squeezed.

18. The filter system of claim 10, further comprising one or more orientation guide projections formed on the filter tray and adapted to fit to an orientation guide slot in the filter tray receptacle.

19. An air cleaner, comprising:
    a chassis including a filter tray receptacle;
    one or more filter elements;

a filter tray adapted to be received in the filter tray receptacle, with the filter tray including a bottom surface and one or more bottom airflow apertures formed in the bottom surface and wherein the filter tray receives the one or more filter elements, wherein the filter tray and the one or more filter elements are configured to slide into and out of the filter tray receptacle; and one or more orientation guide projections formed on the filter tray and adapted to fit to an orientation guide slot in the filter tray receptacle.

20. The air cleaner of claim 19, further comprising a tray cover portion that fits to the filter tray and traps the one or more filter elements, with the tray cover portion including one or more top airflow apertures.

21. The air cleaner of claim 19, with the tray cover portion being affixed to the filter tray by one or more fasteners and one or more corresponding fastener apertures.

22. The air cleaner of claim 19, further comprising:
one or more fastener projections extending from one of the filter tray or the tray cover portion; and
one or more corresponding fastener apertures formed on the opposing tray cover portion or the opposing filter tray, wherein the one or more fastener apertures receive and trap the one or more fastener projections.

23. The air cleaner of claim 19, further comprising:
one or more barbed fastener projections extending from one of the filter tray or the tray cover portion; and
one or more corresponding fastener apertures formed on the opposing tray cover portion or the opposing filter tray, wherein the one or more fastener apertures receive and trap the one or more barbed fastener projections.

24. The air cleaner of claim 19, further comprising a grip portion that extends from a front of the filter tray.

25. The air cleaner of claim 19, further comprising a door hinged to the chassis, wherein the door blocks the filter tray receptacle when the filter tray is not in place.

26. The air cleaner of claim 19, further comprising a switch that is contacted by the filter system when the filter system is in place in the filter tray receptacle, wherein the switch indicates when the filter system is in place in the filter tray receptacle.

27. The air cleaner of claim 19, further comprising one or more latch projections that extend from at least one side of the filter tray, with the one or more latch projections being adapted to latch to a chassis of the air cleaner.

28. The air cleaner of claim 19, further comprising:
a grip portion that extends from a front of the filter tray; and
one or more latch projections that extend from at least one side of the filter tray, with the one or more latch projections being adapted to latch to a chassis of the air cleaner, wherein the one or more latch projections are configured to disengage the chassis when the grip portion is squeezed.

\* \* \* \* \*

UNITED STATES PATENT AND TRADEMARK OFFICE
CERTIFICATE OF CORRECTION

PATENT NO. : 7,794,518 B2  Page 1 of 1
APPLICATION NO. : 11/364171
DATED : September 14, 2010
INVENTOR(S) : Paterson et al.

It is certified that error appears in the above-identified patent and that said Letters Patent is hereby corrected as shown below:

On the Title Page:
Item (56), Foreign Patent Document, add the following reference: -- EP   1172240   1/2002 --.

Signed and Sealed this

Second Day of November, 2010

David J. Kappos
*Director of the United States Patent and Trademark Office*